(12) United States Patent
Sakamoto et al.

(10) Patent No.: US 6,981,717 B2
(45) Date of Patent: Jan. 3, 2006

(54) ATTACHMENT STRUCTURE OF A LOAD SENSOR FOR A VEHICLE SEAT

(75) Inventors: Kazunori Sakamoto, Chiryu (JP);
Yasuaki Suzuki, Kariya (JP); Tsutomu Takeuchi, Gamagori (JP); Morio Sakai, Toyota (JP); Yasunori Hasegawa, Kasugai (JP); Kentaro Morishita, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 49 days.

(21) Appl. No.: 10/242,435

(22) Filed: Sep. 13, 2002

(65) Prior Publication Data

US 2003/0067196 A1 Apr. 10, 2003

(30) Foreign Application Priority Data

Sep. 13, 2001 (JP) ............................. 2001-278516

(51) Int. Cl.
*B60R 21/32* (2006.01)
(52) U.S. Cl. .................. 280/735; 180/273; 297/217.2; 340/667
(58) Field of Classification Search ................ 180/273; 280/735; 340/667; 73/862.627; 297/217.2
See application file for complete search history.

(56) References Cited

U.S. PATENT DOCUMENTS

| | | | | |
|---|---|---|---|---|
| 5,971,432 A | * | 10/1999 | Gagnon et al. ............. | 280/735 |
| 6,069,325 A | * | 5/2000 | Aoki ........................... | 177/136 |
| 6,161,891 A | * | 12/2000 | Blakesley ................. | 296/65.01 |
| 6,231,076 B1 | * | 5/2001 | Blakesley et al. .......... | 280/735 |
| 6,288,649 B1 | * | 9/2001 | Wolfe ......................... | 340/667 |
| 6,323,443 B1 | * | 11/2001 | Aoki et al. ................. | 177/144 |
| 6,342,683 B1 | * | 1/2002 | Aoki et al. ................. | 177/144 |
| 6,356,200 B1 | * | 3/2002 | Hamada et al. ............. | 340/667 |
| 6,397,688 B1 | * | 6/2002 | Sakamoto et al. ...... | 73/862.637 |
| 6,520,023 B2 | * | 2/2003 | Kimura ....................... | 73/795 |
| 6,563,429 B2 | * | 5/2003 | Sakai et al. ................. | 340/667 |
| 6,571,647 B1 | * | 6/2003 | Aoki et al. ............ | 73/862.381 |
| 6,612,614 B2 | * | 9/2003 | Wolfe ......................... | 280/735 |
| 6,617,531 B1 | * | 9/2003 | Aoki ........................... | 177/144 |
| 6,640,653 B1 | * | 11/2003 | Ishida ..................... | 73/862.627 |

FOREIGN PATENT DOCUMENTS

EP  0 962 362 A2  12/1999
JP  2001-12998 A  1/2001

* cited by examiner

Primary Examiner—Paul N. Dickson
Assistant Examiner—Toan C. To
(74) Attorney, Agent, or Firm—Buchanan Ingersoll PC (57) ABSTRACT

An attachment structure for installing a load sensor to a vehicle seat includes the load sensor having a plate-shaped strain unit and a strain gauge for detecting a strain of the plate-shaped strain unit. The load sensor is structured that one end of the plate-shaped strain unit is fixed to a seating portion of the vehicle seat and the other end of the strain unit is fixed to a vehicle body. Also, a strain portion is defined between each fixed end of the plate-shaped strain unit, and the strain portion is deformable in a vertical direction relative to the vehicle seat. In addition, a load input point from the seating portion is defined approximately at a central portion of the strain portion of the plate-shaped strain unit.

8 Claims, 7 Drawing Sheets

ATTACHMENT STRUCTURE OF A LOAD SENSOR FOR A VEHICLE SEAT

CROSS REFERENCE OF RELATED APPLICATION

This application is based on and claims priority under 35 U.S.C. §119 with respect to Japanese Application No. 2001-278516 filed on Sep. 13, 2001, the entire content of which is incorporated herein by reference.

FIELD OF THE INVENTION

This invention relates to an attachment structure of a load sensor for a vehicle seat. More particularly, the present invention pertains to an attachment structure of a load sensor which detects a load on a seating portion of a seat when a passenger sits on the vehicle seat.

BACKGROUND OF THE INVENTION

In recent years, there is a tendency toward enforcing a safety of a passenger of a vehicle. In order to improve the safety of the passenger who sits on a seat, a restraint function of a seat belt and an operating function of an air bag in accordance with a weight of the passenger have been developed. When these devices are adopted, an accurate detection of a weight of the passenger is needed. As for one such means, a known device is disclosed in Japanese Patent Laid-Open Publication No.2001-12998. The known device applies a means for attaching a weight sensor (ie., an attachment structure of a load sensor) to a seat mounted in a vehicle (ie., a vehicle seat).

Normally, as for a weight sensor to detect a weight of the passenger who sits on a seat cushion of the vehicle seat, a sensor with a strain gauge disposed in a plate-shaped strain unit is used for detecting a vertical strain of the strain unit. Therefore, in order to detect the weight of the passenger on the seat accurately, a precise input of the weight from the seating portion to a strain portion of the strain unit is needed. Thus, an attachment structure of a load sensor for a vehicle seat is particularly important.

However, in the known device, such importance of the attachment structure of the load sensor to the vehicle has not been recognized, and is designed merely not to exceed a height of the seating portion in a normal sitting condition when the weight sensor is attached.

SUMMARY OF THE INVENTION

Accordingly, an object of this invention is to provide an attachment structure of a load sensor for a vehicle seat which can precisely detect a weight of a passenger on a seat.

According to the first aspect of the invention, the attachment structure for installing the load sensor to the vehicle seat includes the load sensor having a plate-shaped strain unit and a strain gauge for detecting a strain of the plate-shaped strain unit. The load sensor is structured that one end of the plateshaped strain unit is fixed to a seating portion of the vehicle seat and the other end of the strain unit is fixed to a vehicle body. Also, a strain portion is defined between each fixed end of the plate-shaped strain unit, and the strain portion is deformable in a vertical direction relative to the vehicle seat. In addition, a load input point from the seating portion is defined approximately at a central portion of the strain portion of the plate-shaped strain unit.

According to the second aspect of the invention, the attachment includes a strain restriction means for restricting the strain of the plate-shaped strain unit in the vertical direction to a predetermined value.

According to the third aspect of the invention, the attachment structure has a first attachment bracket for holding the one fixed end of the plate-shaped strain unit and attached to the vehicle seat through a connecting pin located at a portion upward or downward relative to and opposed to the central portion of the strain portion of the plate-shaped strain unit. The attachment structure also has a second attachment bracket for holding the other fixed end of the strain unit and attached to the vehicle body. Furthermore, the strain restriction means for restricting the strain of the plate-shaped strain unit in the vertical direction to the predetermined value is formed by inserting the connecting pin into a stopper hole provided in the second attachment bracket with a predetermined clearance in the vertical, direction relative to the vehicle seat.

According to the fourth aspect of the invention, an attachment structure is characterized in that the connecting pin is rotatably attached to either one of the first attachment bracket and the seating portion of the vehicle seat through a bush relative to the seating portion of the vehicle seat.

Figure 6:
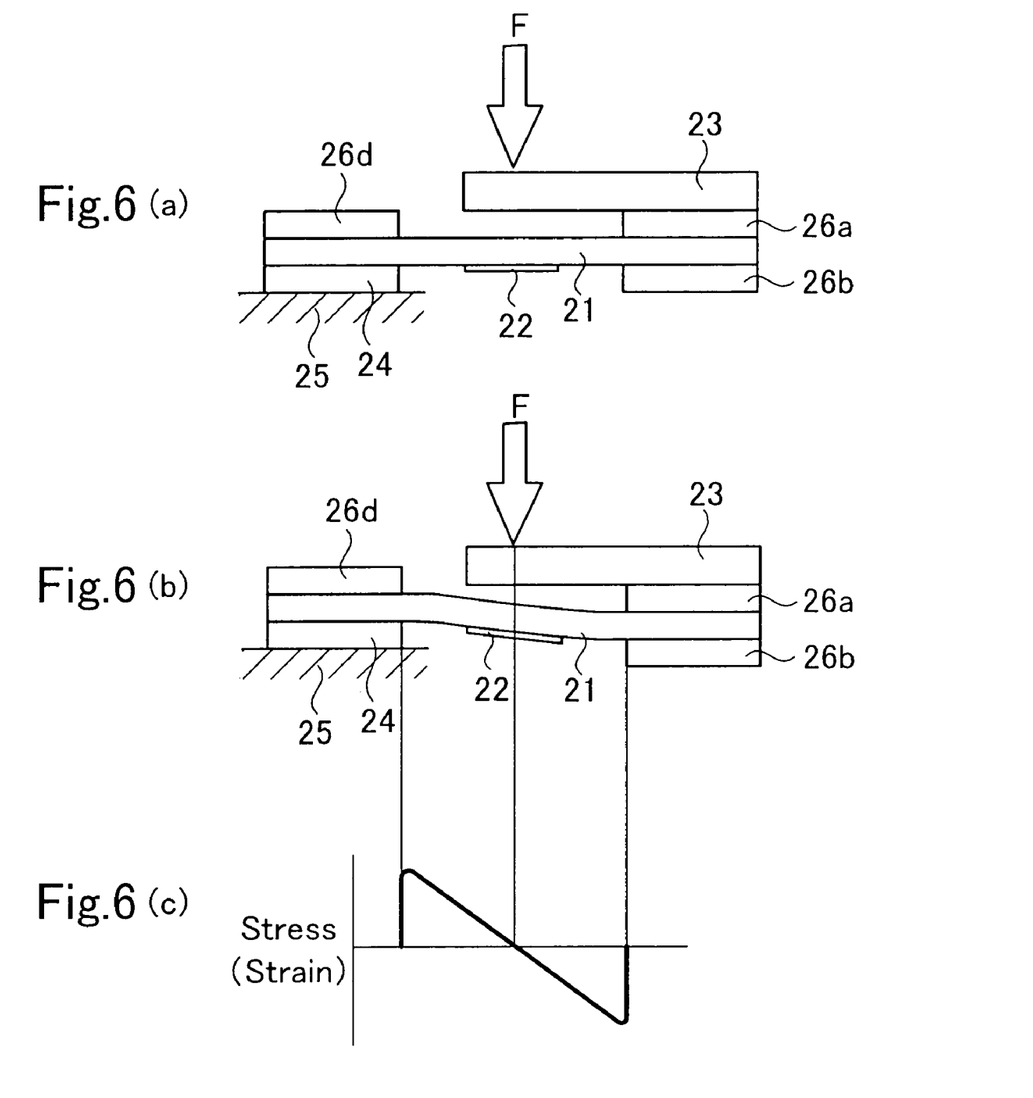
FIG. 6 is a pattern diagram of the attachment structure shown in FIG. 1 when a load is given.

As the first aspect of the invention, the strain portion is defined between each fixed end of the plate-shaped strain unit, and it is deformable in a vertical direction relative to the vehicle seat. Furthermore, a load input point from the seating portion is defined approximately at a central portion of the strain portion of the plate-shaped strain unit. Consequently, the maximum stress can be reduced by improving a stress balance of the stress generated by a load input (shown in FIG. 6($c$) in comparison with FIG. 7(C)). Therefore, downsizing and weight reduction of the strain plate can be achieved.

Since the load input point from the seating portion is defined approximately at the central portion of the strain portion of the strain unit, when the load is inputted into the attachment structure unit, stress is distributed that both ends of the strain portion receive the maximum stress and the central portion of the strain portion receives the minimum stress, being deformed in the vertical direction relative to the vehicle seat, (shown in FIG. 6($c$)). Because the maximum stress is reduced and the stress balance is improved, secular change is also reduced. Thus, the load sensor can maintain a precise detection of the load from the seating portion, in other words, a weight of a passenger. In this case, it is desirable to install a strain restriction means for restricting a strain of the strain unit in a vertical direction in the attachment structure which is mounted with the load sensor.

Also, according to the second aspect of the invention, the strain restriction means is formed by inserting the connecting pin in the second attachment bracket. In other words, the strain restriction means can be disposed inside the attachment structure unit without increasing a number of parts, and an accuracy of the positions of the component members which form the attachment structure unit is secured. As a result, the manufacturing accuracy can be improved as well.

Furthermore, the connecting pin is located at the portion upward or downward relative to and opposed to the central portion of the strain portion of the plate-shaped strain unit. In other words, because the connecting pin is positioned on an axial line of the load input, the strain can be restricted precisely.

In addition, the connecting pin is rotatably attached to the first bracket or the seating portion of the vehicle seat through a bush. Thus, a stress generated by friction between the connecting pin and the first attachment bracket or between the connecting pin and the seating portion of the vehicle seat can be prevented. As a result, effects related to the stress on the strain portion of the strain unit are prevented. Therefore, a stabilization of a performance of the load sensor can be achieved.

BRIEF DESCRIPTION OF THE INVENTION

The foregoing and additional features and characteristics of the present invention will become more apparent from the following detained description considered with reference to the accompanying drawing figures in which like reference numerals designate like elements.

DETAILED DESCRIPTION OF THE INVENTION

Figure 1:
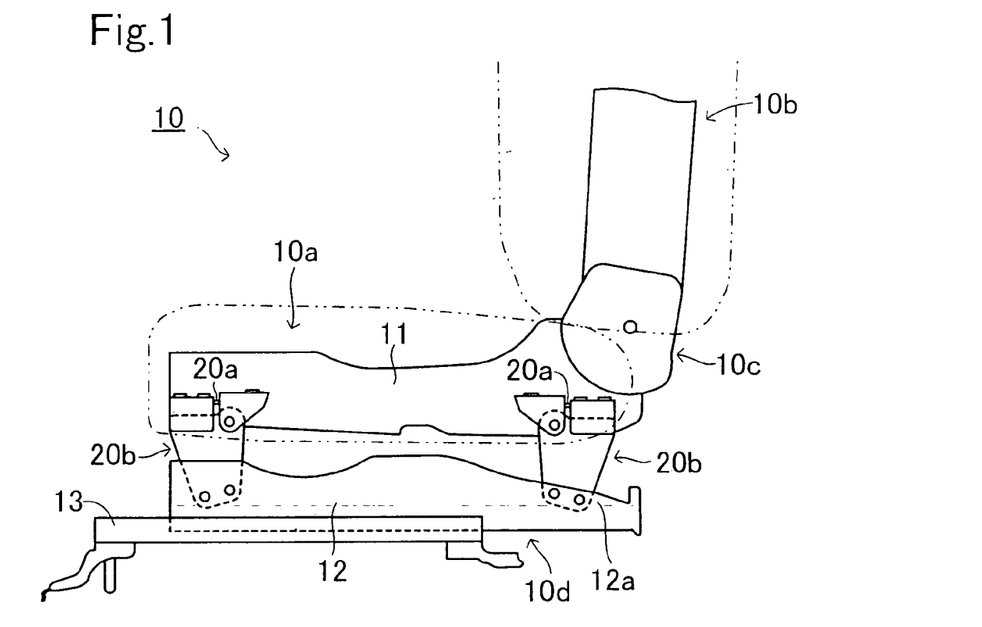
FIG. 1 is a schematic side view of a seat for a vehicle with a load according to an embodiment of the invention.

An embodiment of this invention will be explained with reference to the attached drawings. FIG. 1 shows a vehicle seat with a load sensor by applying an attachment structure according to one example of this invention. The vehicle seat 10 is comprised of a seat cushion 10a, a seat back 10b, a reclining mechanism 10c, a slide mechanism 10d, and an attachment structure unit 20b with a load sensor 20a installed between the seat cushion 10a, and the slide mechanism 10d.

In the vehicle seat 10, a lower end of the seat back 10b is installed in a rear end of the seat cushion 10a through the reclining mechanism 10c. The seat back 10b is held in a standing position by a function of the seat reclining mechanism 10c, and a reclining position of the seat back 10b in a longitudinal direction relative to the seat cushion 10a can be adjusted by operating the reclining mechanism 10c.

In the vehicle seat 10, a seat body is disposed on a floor of a vehicle body through the slide mechanism 10d having an upper rail 12 and a lower rail 13. A cushion frame 11 of the seat cushion 10a forming the vehicle seat 10 is supported through each of the attachment structure units 20b applied to attach four load sensors 20a in the upper rail 12 forming the slide mechanism 10d. The seat body is fixed to a required position by a function of the slide mechanism 10d, and by operating the slide mechanism 10d, a longitudinal position of a seat body relative to the vehicle seat 10 can be adjusted.

In the vehicle seat 10, the seat cushion 10a corresponds to a seating portion of a seat of the present invention, and the slide mechanism 10d corresponds to a vehicle body of the present invention. The four load sensors 20a are arranged between the cushion frame 11 of the seat cushion 10 and the upper rail 12 of the slide mechanism 10d. More specifically, two of the load sensors 20a are placed in right and left portions in a front side relative to the seat cushion 10a, and the other two load sensors 20a are arranged at right and left portions in a back side of the vehicle seat 10 relative to the seat cushion 10a.

In the vehicle seat 10 shown in FIG. 1, structures of both attachment structure units 20b mounted with load sensors 20a respectively are identical except that the load sensors 20a in the front and back are placed in reverse in longitudinal direction relative to the vehicle seat 10. Therefore, with respect to a description of the attachment structure of the load sensor 20a, the attachment structure of the load sensor 20a located in back and left sides of the seat cushion 10a relative to the vehicle seat 10 and its attachment structure unit 20b will be described in detail. On the other hand, the load sensors 20a arranged at the other parts of the vehicle seat 10 and their attachment structure units 20b will be described only when necessary.

Figure 3:
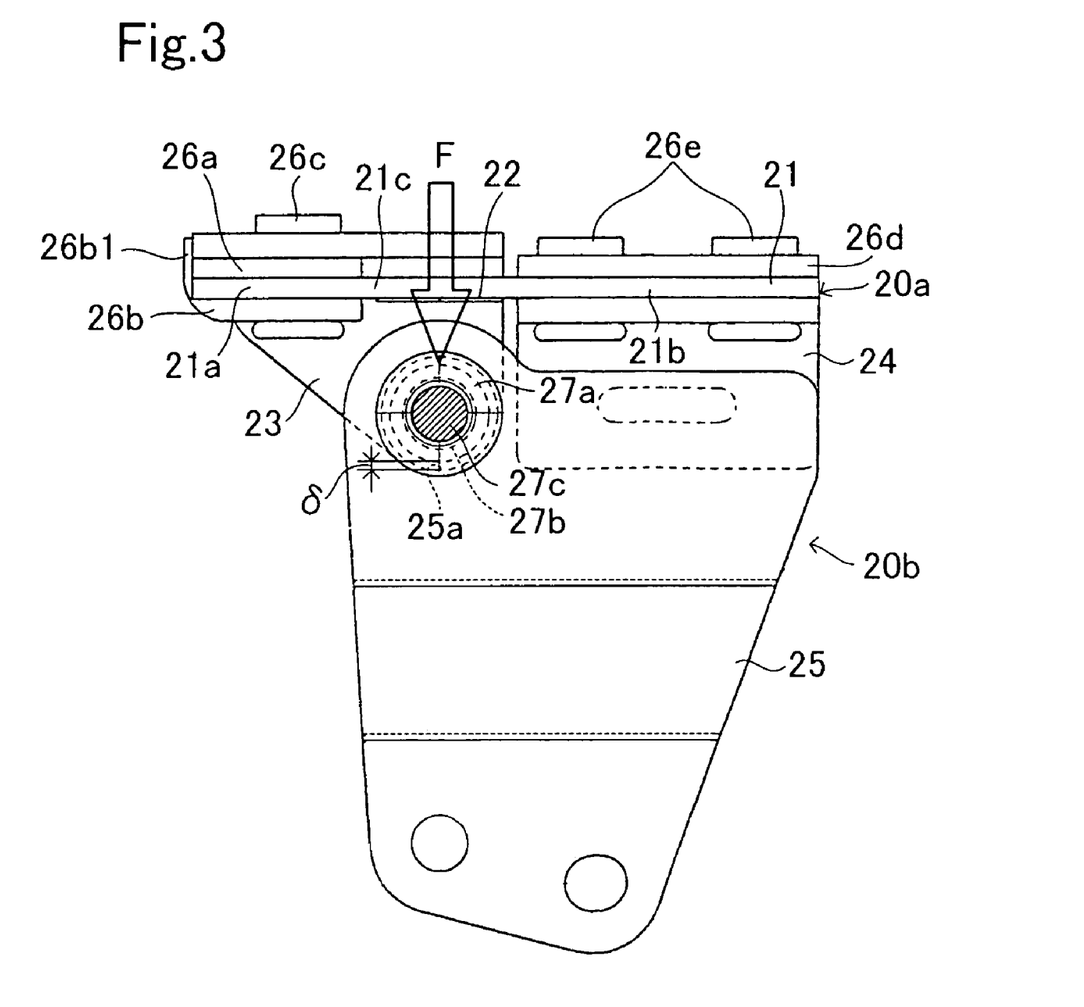
FIG. 3 is an enlarged view of the attachment structure shown in FIG. 1.
Figure 4:
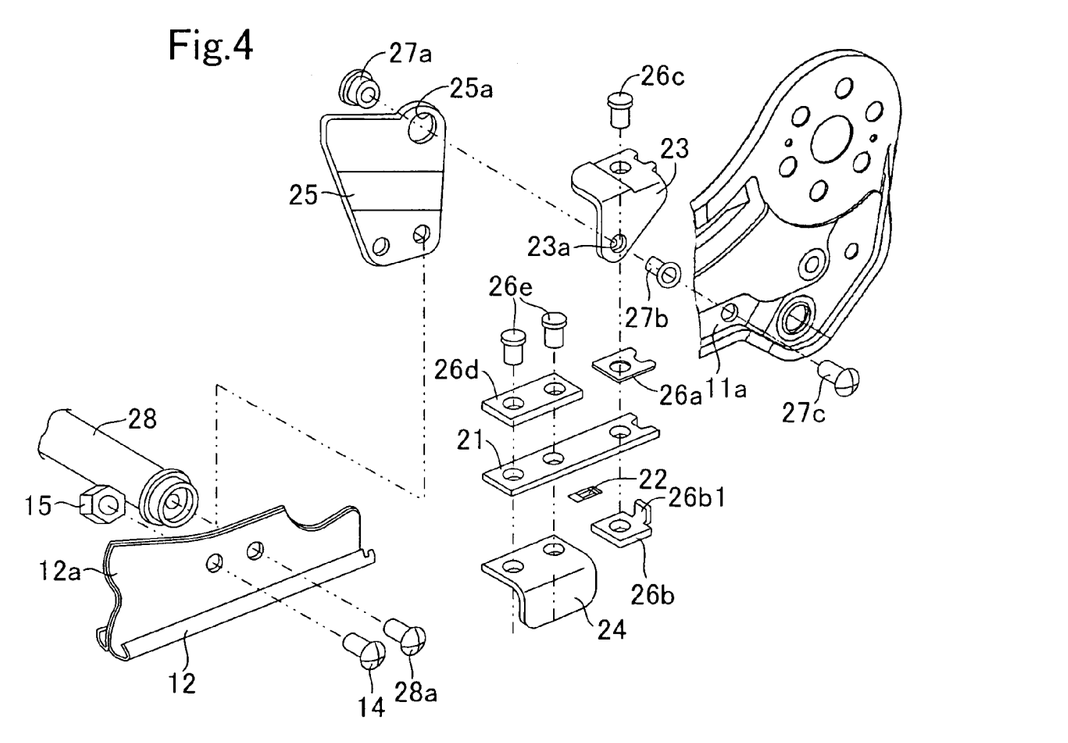
FIG. 4 is an exploded perspective view of the attachment structure shown in FIG. 1.

As shown in FIG. 3 and FIG. 4, the load sensor 20a includes a strain plate 21 (ie., a strain unit) and a strain gauge 22. The strain gauge 22 is adhered to a middle portion of a lower surface of the strain plate 21 in the longitudinal direction relative to the strain plate 21, and the load sensor 20a is assembled within the attachment structure unit 20b.

As shown in FIG. 3 and FIG. 4, the load sensor 20a includes an upper bracket 23, a lower bracket 24, and a base bracket 25 as primary components, and cross sectional surfaces of the upper bracket 23 and the lower bracket 24 are close to "L" shape. A shape of the base bracket 25 is a slightly bent flat plate. The lower bracket 24 is fixed on an upper end of the base bracket 25 by welding. The base bracket 25 functions to fix the lower bracket 24 in an arm 12a (ie., a longitudinal wall relative to the vehicle seat 10) of the upper rail 12 located in the slide mechanism 10d.

Figure 5:
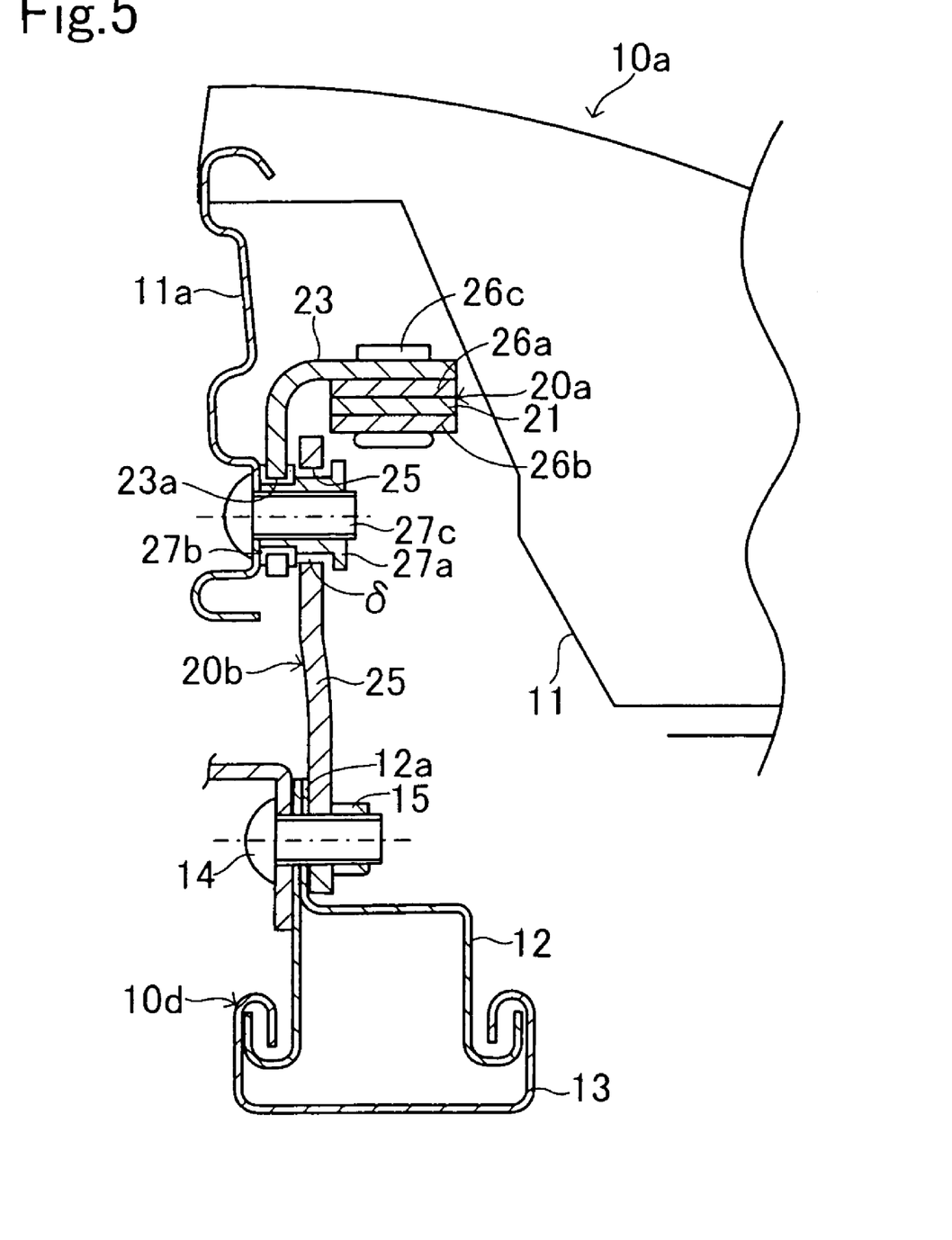
FIG. 5 is a longitudinal sectional view of the attachment structure shown in FIG. 1.

In the attachment structure unit 20b, the upper bracket 23 corresponds to a first attachment bracket of the present invention, and one end of the strain plate 21 forming the load sensor 20a is fixed by being retained between an upper spacer 26a and a lower spacer 26b through a rivet 26c. Furthermore, as shown in FIG. 5, the upper bracket 23 is installed in a side panel 11a of the cushion frame 11, and the upper bracket 23 is connected to the base 25 through the load sensor 20a. In addition, a positioning portion 26b1 is formed in a lower spacer 26b to engage each notch disposed in the strain plate 21, the upper bracket 23, and the upper spacer 26a to fix them together by detent. By this structure, a position of a strain portion 21c is determined accurately (ie., a determination of the value of the strain portion).

Also, in the attachment structure unit 20b, the lower bracket 24 is integral with the base bracket 25, forming a second attachment bracket of the present invention. On an upper surface of an upper wall of the lower bracket 24, the other end of the strain plate 21 forming the load sensor 20a is fixed through a pair of rivets 26e, being retained between the lower bracket 24 and a spacer 26d. As shown in FIG. 4 and FIG. 5, the base bracket 25 is fixed by securing its lower side surface portion in the arm 12a of the upper rail 12 through a bolt 14, a nut 15, a bolt 28a, and a connecting rod 28. Furthermore, the base bracket 25 is connected to the upper bracket 23 through the lower bracket 24 and the load sensor 20a.

A pierce nut 27a, a bush 27b, and a bolt 27c are used for connecting the side panel 11 a of the cushion frame 11 to the upper bracket 23, and as shown in FIG. 5, the bush 27b is fitted in an installation hole 23a of the upper bracket 23 by staking. A bearing metal with low frictional resistance is used for the bush 27b. The pierce nut 27a is inserted into a stopper hole 25a of the base bracket 25 with a predetermined clearance 6 in the vertical direction relative to the vehicle seat 10. Under this condition, an end portion of the pierce nut 27a is fitted within an inner hole of the bush 27b so that the pierce nut 27a can be rotated relatively with the bush 27b.

The bolt 27c is screwed into the pierce nut 27a which is fitted as shown in FIG. 5 by being inserted from outside the side panel 11a of the cushion frame 11. The pierce nut 27a and the bolt 27b are integral with one another, forming a connecting pin of the present invention. Also, the pierce nut 27a and the stopper hole 25a of the base bracket 25 forms a strain restriction means for restricting a strain (ie., an elastic deformation) of the strain plate 21 in the vertical direction relative to the vehicle seat 10 to a predetermined value, functioning as a limiter (ie., protecting the sensor from a breakdown by not reaching a bottom when an excessive load is put on the sensor) against a great load (ie., 1000–1500N) from the seat cushion 10a.

In the attachment structure in which the load sensor 20a is attached, as shown in FIG. 3, the strain portion 21c which is deformable in the vertical direction relative to the vehicle seat 10 is located between retained portions 21a and 21b, and the strain gauge 22 is located in a central portion of a lower side of the strain portion 21c. Furthermore, a connecting portion of the side panel 11a of the cushion frame 11 and the upper bracket 23 (the pierce nut 27a and the bolt 27b) is located in a lower surface of a central portion of the strain portion 21c.

Figure 2:
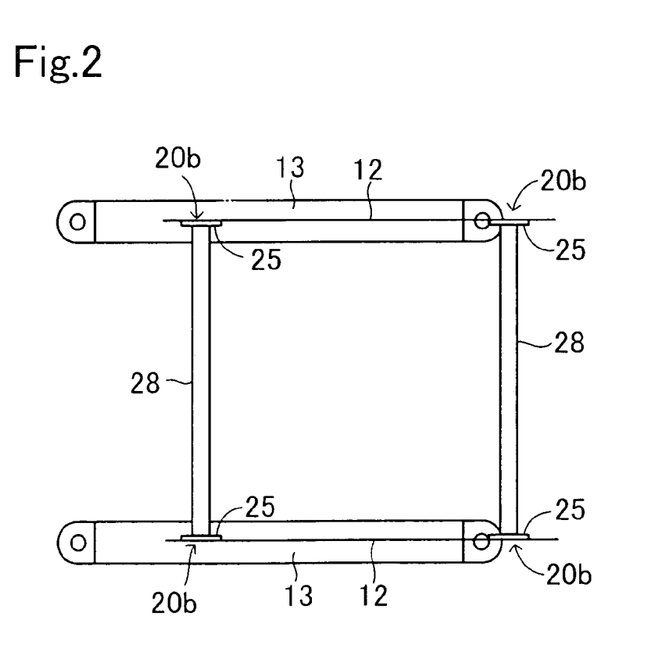
FIG. 2 is a pattern diagram of the attachment structures for installing the load sensors shown in FIG. 1 located right and left relative to the seat under the condition in which they are connected each other.

In both attachment structure units 20b arranged at right and left sides of the seat cushion 10a relative to the vehicle seat 10, both base brackets 25 which form the attachment structure units 20b are connected to each other through the connecting rod 28 shown in FIG. 2 and FIG. 4. The connecting rod 28 is installed by fitting its both ends in the base bracket 25 and the upper rail 12 respectively through the bolt 28a.

By the above structure, as shown schematically in FIG. 2, the connecting rod 28 maintains a predetermined width between the base brackets 25 of right and left of the seat cushion 10a relative to the seating portion by connecting the base brackets 25 of the right and left of the seat cushion 10a relative to the seating portion. In other words, the connecting rod 28 maintains the predetermined width of the attachment structure units 20b which are integral with the base brackets 25. Moreover, with respect to a connection of the attachment structure units 20b of the right and left of the seat cushion 10a relative to the vehicle seat 10, the upper brackets 23 disposed in the attachment structure units 20b of the right and left of the seat cushion 10a relative to the vehicle seat 10c an be connected each other through the connecting rod 28. By this structure, the width between the attachment structures 20b of the right and left of the seat cushion 10a relative to the vehicle seat 10 can also be maintained consistently.

In the attachment structure (ie., the attachment structure unit 20b) described above, one end of the strain plate 21 forming the load sensor 20a is fixed to the cushion frame 11 of the seat cushion 10a located in the seating portion by way of one or more connecting members such as those described above. At the same time, the other end of the strain plate 21 is fixed to the upper rail 12 of the slide mechanism 10d located in the vehicle body by way of one or more connecting members such as those described above. A strain portion 21c is defined between the fixed ends of the strain plate 21, and a load input position from the seat cushion 10a (ie., a load F shown with the arrow in FIG. 3) is defined at an approximately center of the strain portion 21c of the strain plate 21.

Figure 7:
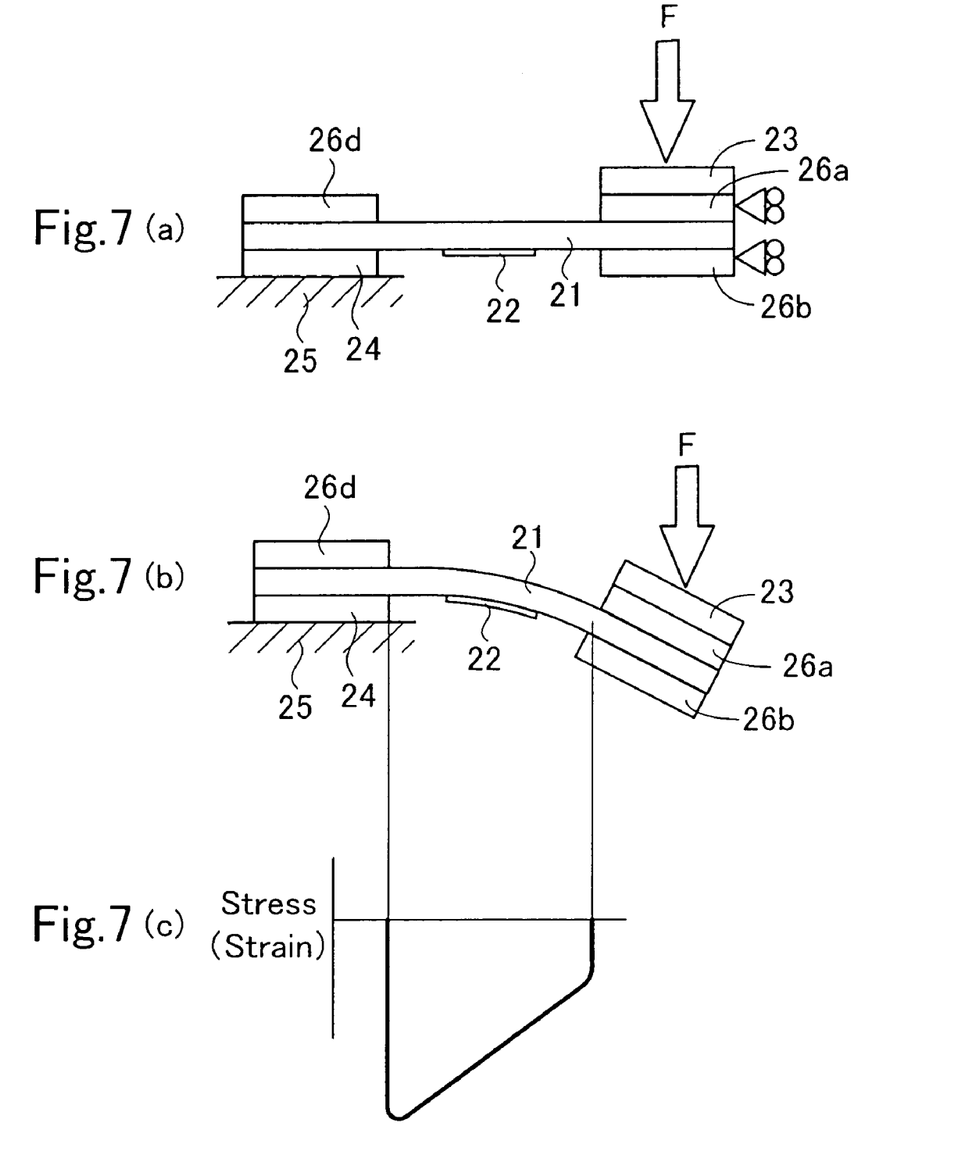
FIG. 7 is a pattern diagram to be compared with FIG. 6.

Therefore, when the load F is inputted into the attachment structure unit 20b as shown in FIG. 6(a), the strain portion 21c of the strain plate 21 is deformed in the vertical direction relative to the vehicle seat 10 as shown in FIG. 6(b), and a stress (ie., a strain) is distributed that the both ends of the strain plate 21 receive the maximum positive and negative stresses respectively, and the central portion of the strain plate 21 receives the minimum stress as shown in FIG. 6(c). However, if the load input point from the seat cushion 10a is defined in one side of the strain portion 21c, when the load is inputted into the attachment structure unit 20b, the stress (ie., the strain) is distributed that, as shown in FIG. 7(c), the other end of the strain plate 21 receives the maximum stress (ie., a greater value than the maximum value shown in FIG. 6), and the one end of the strain plate 21 receives the minimum stress. Therefore, the stress distribution of a structure shown in FIG. 7 not only causes an uneven stress distribution, it also increases the maximum stress. If an excessive stress is put on the strain plate 21, a residual strain in the strain portion 21 can be occurred. Consequently, the stress distribution shown in FIG. 7 can damage the strain plate 21, and an accurate detection of the load from the seating portion becomes impossible.

Therefore, according to the attachment structure unit 20b, by minimizing the maximum stress and improving the balance of the stress generated by the load input toward the strain portion 21c of the strain plate 211 (ie., FIG. 6(c) compared with FIG. 7(c)), the structure in which the stress is inputted into the attachment structure unit 20b prevents the strain plate 21 from damages caused by the excessive stress and uneven stress distribution. Also, by the above structure, downsizing and weight reduction of the strain plate 21 can be achieved. At the same time, by designing the strain portion within the value of predetermined stress (or strain), an extraction of a strain signal from the strain gauge 22 on a large scale becomes possible. Thus, from a viewpoint of levels of the signals (S/N ratio) toward noise, the attachment structure unit 20b is improved, maintaining high accuracy of the detection. Furthermore, because the maximum stress is reduced and the stress balance is improved, a secular change is also reduced. Thus, the load sensor 20a can maintain a precise detection of the load from the seating portion, in other words, a weight of a passenger.

Moreover, according to the attachment structure, the attachment structure unit 20b has the upper bracket 23 installing one end of the strain plate 21 to the seat cushion 10a of the vehicle seat by retaining one end of the strain plate. The attachment structure unit 20b also has the lower bracket 24 integral with the base bracket 25 which is installed in the upper rail 12 located in the vehicle body by retaining the other end of the strain plate 21.

In addition, in the attachment structure unit 20b, the bolt 27c of the upper bracket 23 side is screwed and connected to the pierce nut 27c which is inserted into the stopper hole 25a in a portion downward relative to and opposed to the central portion of the strain portion 21c. By this structure, the strain restriction means is formed by forming, the circularly-ranged clearance (ie., the clearance 6 in the vertical direction relative to the vehicle seat 10) between a circular outer periphery of the pierce nut 27a and a circular inner periphery of the stopper hole 25a of the base bracket.

The strain restriction means restricts the strain of the strain plate 21 in the vertical direction relative to the vehicle seat 10 to the predetermined value. Also, the pierce nut 27a is installed by being screwed into a connecting hole 23a through the bush 27b with low frictional resistance (ie., a low coefficient of friction).

According to the attachment structure unit 20b, the strain restriction means can be achieved without increasing the number of parts within the attachment structure unit 20b. Furthermore, upon an assembly process of the attachment structure unit 20b, the upper bracket 23 and the lower bracket 24 are assembled in both ends of the strain plate 21 at first. Under this condition, the installation hole 23 is aligned coaxially with the stopper hole 25a of the base bracket 25 as the lower bracket 24 and the base bracket 25 are welded. By this assembly process, an accuracy of the position of each component member comprising the attachment structure unit 20b is assured. Consequently, a manufacturing accuracy can be heightened. Also, as shown in FIG. 3, the pierce nut 27a and the stopper hole 25a, in other words, the strain restriction means, are arranged on the input line of the load F. Therefore, the strain of the strain plate 21 in the vertical direction relative to the vehicle seat 10 can be restricted precisely to the predetermined value. Moreover, by the above structure, the stress generated by the friction in the installation hole 23a of the upper bracket 23 of the pierce nut 27a comprising the connecting pin is prevented. As a result, effects related to the stress on the strain portion 21c of the strain plate 21 are prevented. Therefore, a stabilization of a performance of the load sensor 20a can be achieved.

On the other hand, in the vehicle seat 10, four load sensors 20a are placed in the side portions of the front and back of the seat cushion 10a relative to the vehicle seat 10 respectively, and the base brackets 25 of the attachment structures 20b on the right and left of the seat cushion 10a relative to the vehicle seat 10 are connected to each other by the connecting rod 28. By this structure, attachment errors relative to each load sensor 20a on the right and left of the seat cushion relative to the seating portion and an unnecessary stress affecting the load sensor 20a caused by the pitch discrepancy between the rails can be prevented. Moreover, an unnecessary stress caused by the distortion and deflection of the seat cushion 10a when the passenger sits on the seat cushion 10a can be prevented as well (In order to acquire this function effectively, it is desirable to apply the structure that the upper brackets 23 of the attachment structure units 20b of the right and left are connected each other by the connecting rod 28).

In the embodiment of this invention, the strain restriction means for restricting the strain of the strain plate 21 in the vertical direction relative to the vehicle seat 10 in the predetermined value is installed in the portion located downward relative to and opposed to the central portion of the strain portion 21c of the strain plate 21. However, it is possible to install the strain restriction means in a portion located upward relative to and opposed to the central portion of the strain portion 21c of the strain plate 21. Furthermore, although the strain plate 21 and the spacers 26a, 26b, and 26d are formed separately, it is possible to integrate them together (manufacturing by forging or cutting) to stabilize the performance and reduce the number of parts.

Figure 8:
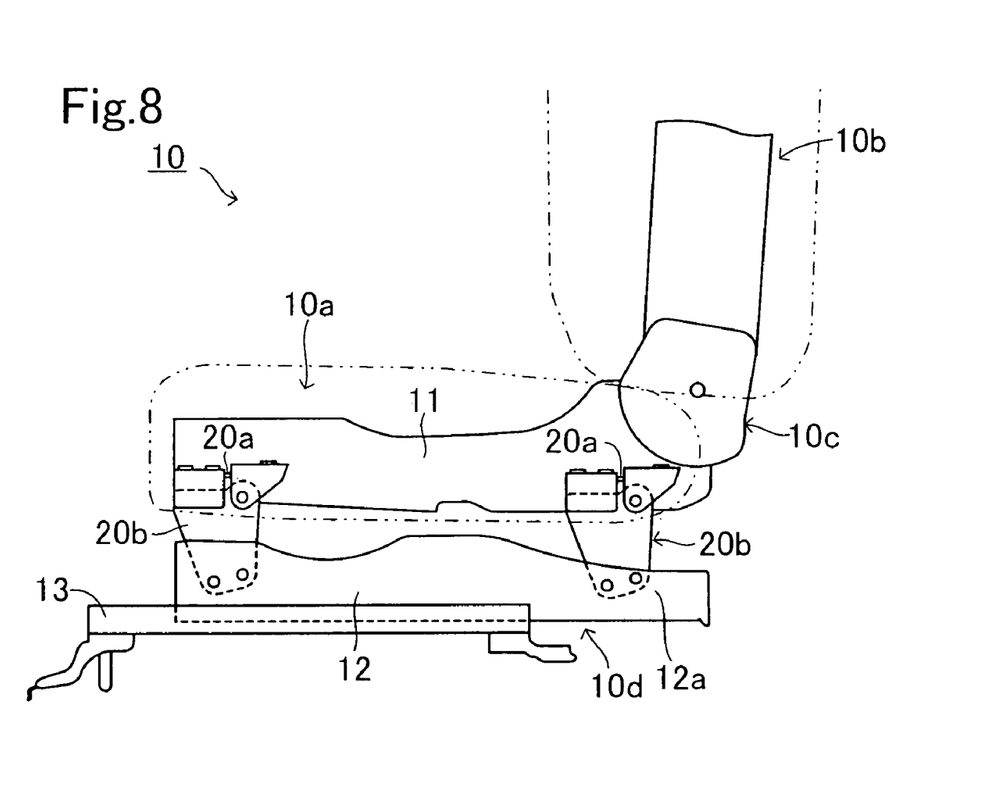
FIG. 8 is a schematic side view showing a vehicle seat in which a layout of the load sensor is changed.

Also, in the embodiment of this invention, as shown in FIG. 1, the load sensor 20a of the front and back relative to the seat cushion are placed opposing each other. However, as shown in FIG. 8, it is possible to place them in the same direction. Moreover, it is possible to place the load sensors 20a shown in FIG. 1 in back to front, or place the load sensors 20a shown in FIG. 8 in back to front.

What is claimed is:

1. An attachment structure for installing a load sensor to a vehicle seat, the load sensor having a plate-shaped strain unit and a strain gauge for detecting a strain of the plate-shaped strain unit, comprising;
   one end of the plate-shaped strain unit being fixed to a cushion frame of the vehicle seat by way of at least one first connecting member and the other end of the strain unit being fixed to a slide mechanism of the vehicle seat by way of at least one second connecting member;
   a strain portion defined between the two ends of the plate-shaped strain unit and being deformable in a vertical direction relative to the vehicle seat;
   a load input point from the seating portion defined approximately at a central portion of the strain portion of the plate-shaped strain unit;
   strain restriction means for restricting the strain of the plate-shaped strain unit in the vertical direction to a predetermined value;
   the at least one first connecting member comprising a first attachment bracket holding the one end of the plate-shaped strain unit and attached to the vehicle seat through a connecting pin located at a portion upward or downward relative to and opposed to the central portion of the strain portion of the plate-shaped strain unit; and
   the at least one second connecting member comprising a second attachment bracket holding the other end of the strain unit and attached to the vehicle body, wherein the strain restriction means for restricting the strain of the plate-shaped strain unit is formed by inserting the connecting pin into a stopper hole provided in the second attachment bracket with a predetermined clearance in the vertical direction relative to the vehicle seat.

2. An attachment structure for installing a load sensor to a vehicle seat according to claim 1, wherein the connecting pin is rotatably attached to either one of the first attachment bracket and the seating portion of the vehicle seat through a bush relative to the seating portion of the vehicle seat.

3. An attachment structure for installing a load sensor to a vehicle seat according to claim 1, wherein the slide mechanism is comprised of an upper rail and a lower rail, the other end of the strain unit being fixed to the upper rail by way of the at least one second connecting member.

4. An attachment structure for installing a load sensor to a vehicle seat according to claim 1, wherein the plate-shaped strain unit extends in a front-to-rear direction of the vehicle seat on one side of the vehicle seat.

5. An attachment structure for installing a load sensor to a vehicle seat, the load sensor having a plate-shaped strain unit and a strain gauge for detecting a strain of the plate-shaped strain unit, comprising;
   a seat slide mechanism having an upper rail and a lower rail, the seat slide mechanism being installed between the vehicle seat and a vehicle floor;
   one end of the plate-shaped strain unit being fixed to a cushion frame of the vehicle seat by way of at least one first connecting member and an opposite end of the strain unit being fixed to the slide mechanism of the vehicle seat by way of at least one second connecting member;
   a strain portion defined between the two ends of the plate-shaped strain unit and being arranged parallel to the seat slide mechanism; and a load input point from a seating portion defined approximately at a central portion of the strain portion of the plate-shaped strain unit;

strain restriction means for restricting the strain of the plate-shaped strain unit in the vertical direction to a predetermined value;

the at least one first connecting member comprising a first attachment bracket holding the one end of the plate-shaped strain unit and attached to the vehicle seat through a connecting pin located at a portion upward or downward relative to and opposed to the central portion of the strain portion of the plate-shaped strain unit; and the at least one second connecting member comprises a second attachment bracket holding the other end of the strain unit and attached to the vehicle body, wherein the strain restriction means for restricting the strain of the plate-shaped strain unit is formed by inserting the connecting pin into a stopper hole provided in the second attachment bracket with a predetermined clearance in the vertical direction relative to the vehicle seat.

6. An attachment structure for installing a load sensor to a vehicle seat according to claim 5, wherein the plate-shaped strain unit extends in a front-to-rear direction of the vehicle seat on one side of the vehicle seat.

7. An attachment structure for installing a load sensor to a vehicle seat, the load sensor having a plate-shaped strain unit and a strain gauge for detecting a strain of the plate shaped strain unit, comprising;

one end of the plate-shaped strain unit being fixed to a seating portion of the vehicle seat by way of at least one first connecting member and an opposite end of the strain unit being fixed to another portion of the vehicle seat other than the seating portion by way of at least one second connecting member;

a strain portion defined between the two ends of the plate-shaped strain unit, the strain portion being positioned so that a total load applied to the vehicle seat passes through the strain portion;

a load input point from a seating portion defined approximately at a central portion of the strain portion of the plate-shaped strain unit;

a strain restriction means for restricting the strain of the plate-shaped strain unit in the vertical direction to a predetermined value;

the at least one first connecting member comprising a first attachment bracket holding the one end of the plate-shaped strain unit and attached to the vehicle seat through a connecting pin located at a portion upward or downward relative to and opposed to the central portion of the strain portion of the plate-shaped strain unit; and the at least one second connecting member comprising a second attachment bracket holding the other end of the strain unit and attached to the vehicle body, wherein the strain restriction means for restricting the strain of the plate-shaped strain unit is formed by inserting the connecting pin into a stopper hole provided in the second attachment bracket with a predetermined clearance in the vertical direction relative to the vehicle seat.

8. An attachment structure for installing a load sensor to a vehicle seat according to claim 7, wherein the plate-shaped strain unit extends in a front-to-rear direction of the vehicle seat on one side of the vehicle seat.

* * * * *